(12) United States Patent
Lee et al.

(10) Patent No.: US 7,772,718 B2
(45) Date of Patent: Aug. 10, 2010

(54) MASTER/SLAVE OUTLET SYSTEM

(75) Inventors: Yu-Lung Lee, Nanjhuang Township, Miaoli County (TW); Kuo-Tian Cheng, Tucheng (TW)

(73) Assignee: Powertech Industrial Co., Ltd., Taipei Hsien (TW)

( * ) Notice: Subject to any disclaimer, the term of this patent is extended or adjusted under 35 U.S.C. 154(b) by 219 days.

(21) Appl. No.: 12/216,088

(22) Filed: Jun. 30, 2008

(65) Prior Publication Data
US 2009/0256425 A1    Oct. 15, 2009

(30) Foreign Application Priority Data
Apr. 9, 2008    (TW) ............................. 97112772 A

(51) Int. Cl.
*H02J 3/14*    (2006.01)

(52) U.S. Cl. ..................................................... 307/41
(58) Field of Classification Search .................... 307/41
See application file for complete search history.

(56) References Cited

U.S. PATENT DOCUMENTS
2003/0179524 A1*    9/2003    Chou ........................... 361/62

\* cited by examiner

*Primary Examiner*—Fritz M Fleming
*Assistant Examiner*—Dru M Parries
(74) *Attorney, Agent, or Firm*—Rosenberg, Klein & Lee

(57) ABSTRACT

A master/slave outlet system includes at least one master outlet and at least one slave outlet. Moreover, the slave outlet is turned on to start the device connected to the slave outlet, while the master outlet supplies enough current to the device connected to the master outlet. Furthermore, the slave outlet is turned off to close the device connected to the slave outlet, while the device connected to the master outlet is shutdown or at sleep mode.

14 Claims, 6 Drawing Sheets

MASTER/SLAVE OUTLET SYSTEM

BACKGROUND OF THE INVENTION

1. Field of the Invention

The present invention relates to a master/slave outlet system; in particular, to an outlet system in which the slave outlet supplies power only when the master outlet starts to.

2. Description of Related Art

Lately people make increasing use of electronic devices, and thus the use of extension lines increases. People also pay increasing attention to convenience, security and power-saving in various electronic devices. Currently, there are several types of commercially available extension line outlets on the market, including single switch control extension line and individual switch control extension line.

Refer to FIG. 1, wherein a perspective diagram of a single switch control extension line is shown. The single switch control extension line 1 (briefly referred as conjunctively-controlled based) has a plug 10, extension line 12 and a body 14, in which on the body 14 there are installed multiple outlets 142 and a switch 144. All outlets 142 installed on the body 14 are controlled by the switch 144, and when the switch 144 is turned on, AC power is introduced from the plug 10 and sent to each outlet 142 via the extension line 12 and the conducting switch 144, so as to allow use by various electronic devices. However, using the single switch control extension line 1 may not achieve the objectives of security and power-saving.

Refer to FIG. 2, wherein a perspective diagram of an individual switch control extension line is shown. The individual switch control extension line 2 (briefly referred as individually-controlled based) has a plug 20, an extension line 22 and a body 24, in which on the body 24 there are installed multiple outlets 242 and multiple switches 244. Each outlet 242 on the body 24 is correspondingly controlled by each switch 244, and when the switch 244 is turned on, AC power is introduced from the plug 20 and sent to each corresponding outlet 242 via the extension line 22 and the conducting switch 244, so as to allow use by various electronic devices.

Refer again to FIGS. 1 and 2. In terms of users, in addition to more functions of outlet 242 on the individual switch control extension line 2, each outlet 242 has respective switch 244 for control, thus, compared with the above-described single switch control extension line 1, it comparatively resolves the problems of security and power-saving. However, since users are required to respectively turn on each switch 244 of the individual switch control extension line 2 to allow use of the corresponding outlet 242, this may cause inconvenience for users during operations.

SUMMARY OF THE INVENTION

In view of the aforementioned issues, the present invention provides a master/slave outlet system, which has at least one master outlet and at least one slave outlet, and when the electronic device connected to the master outlet is supplied with enough current, the slave outlet will become conducting, allowing the electronic device connected to the slave outlet to be turned on accordingly. When the electronic device connected to the master outlet is turned off or enters into sleep mode, the electronic device connected to the slave outlet will be also turned off accordingly.

A master/slave outlet system according to a first embodiment of the present invention comprises an alternative current (AC) plug for receiving AC power; at least one master outlet, coupled to the AC plug; at least one salve outlet; a power switch, whose first end is coupled to the AC plug, and whose second end is coupled to the slave outlet; a current sensor, coupled to the master outlet, for receiving a feedback current from the master outlet, as well as outputting a sensing signal; an operational amplifier, coupled to the current sensor, for amplifying and comparing the sensing signal with a first reference voltage to output a first control signal, and for amplifying and comparing the sensing signal with a second reference voltage to output a second control signal; a power supply, coupled to the AC plug, operational amplifier and power switch, which is controlled by the first control signal, so as to convert the AC power into a supply voltage to provide to the power switch; a driver, coupled to the operational amplifier and power switch, which receives the second control signal and outputs a driving signal to the power switch, so as to control the switching of the power switch.

Furthermore, a master/slave outlet system according to a second embodiment of the present invention, compared with said master/slave outlet system according to the first embodiment of the present invention, additionally comprises a master control switch, coupled between the AC plug and the master outlet, power switch and power supply. The master control switch is used to control the AC power introduced by the AC plug to conduct or be switched off the master outlet, power switch and power supply, in order to provide security for use of electrical power.

Hence, the master/slave outlet system according to the present invention can address the issues of user convenience, security and power-saving; meanwhile, it can also satisfy the requirement for the specification of green energy (standby power <1 W).

The general summary set out supra as well as the detailed description illustrated infra are simply exemplary, which are presented to further explain the true scope of the present invention. Other objectives and advantages of the present invention will be construed in the following detailed description and appended drawings.

DETAILED DESCRIPTION OF THE PREFERRED EMBODIMENTS

Figure 1:
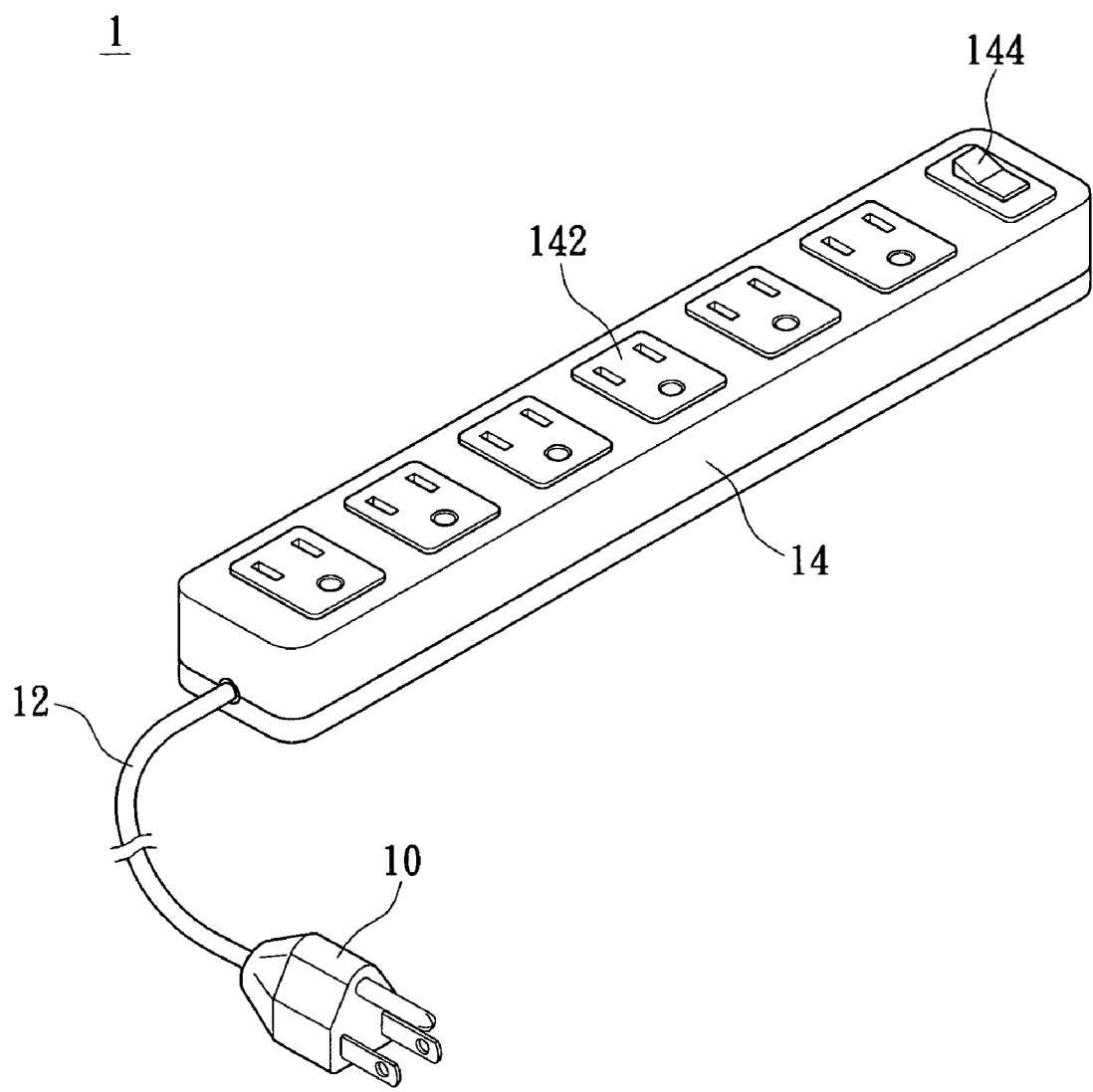
FIG. 1 shows a perspective diagram of a single switch control extension line.
Figure 2:
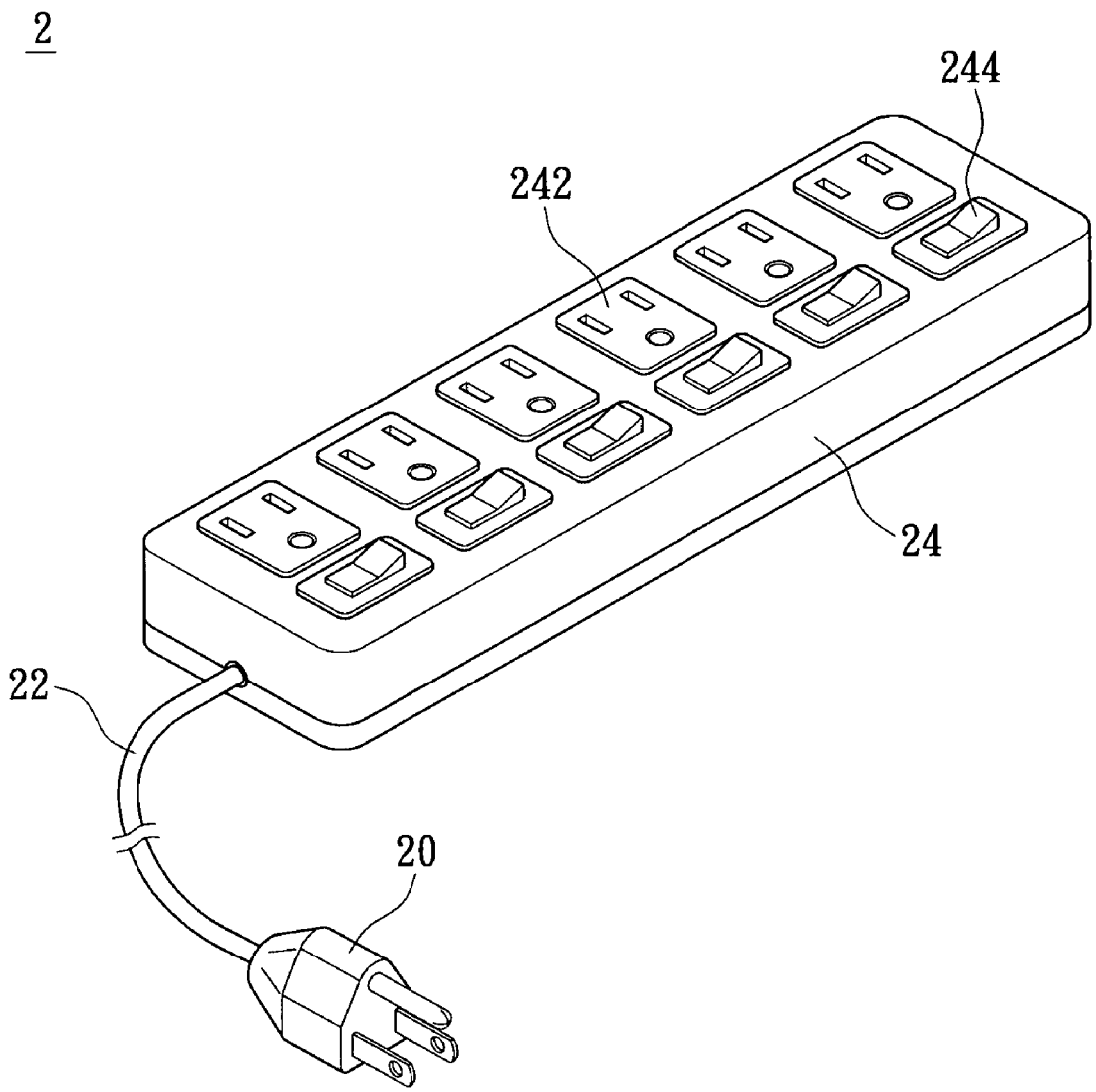
FIG. 2 shows a perspective diagram of an individual switch control extension line.
Figure 3:
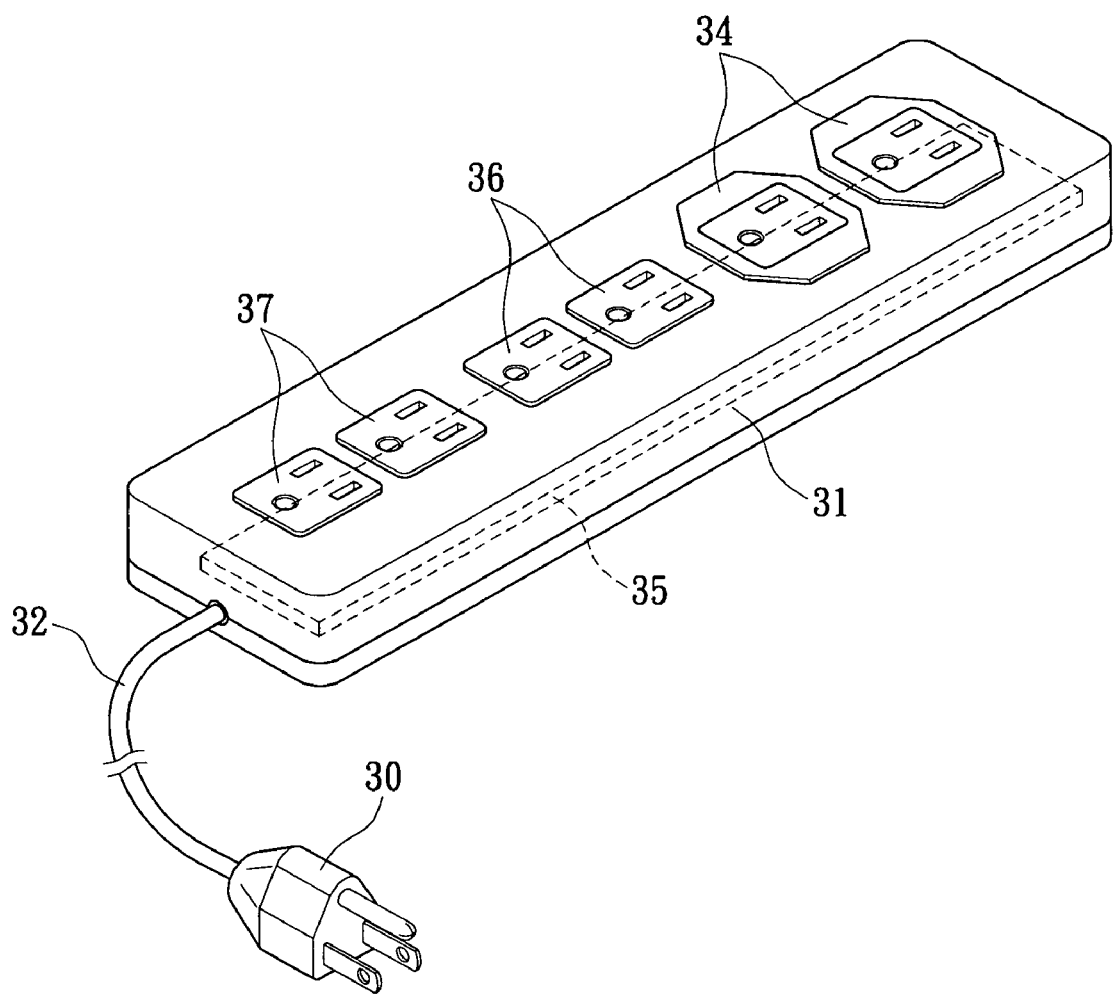
FIG. 3 shows a perspective diagram of a first embodiment according to the present invention.

Refer to FIG. 3, wherein a perspective diagram of a first embodiment according to the present invention is shown. From the prospect of the first embodiment according to the present invention, it can be seen that the illustrated master/slave outlet system 3 comprises an AC plug 30, an extension line 32 and a body 31, wherein on the body 31 there is installed at least one master outlet 34, at least one slave outlet 36 and at least one power outlet 37 directly connected to AC plug 30, and inside the body 31 there is installed a control circuit 35; besides, said master outlets 34, slave outlets 36 and the directly connected power outlets 37 are all coupled to the control circuit 35. Thereby, when the electronic device connected to the master outlet 34 has been supplied with sufficient current, the slave outlet 36 will become conducting, allowing turning on the electronic device connected to the corresponding slave outlet. Besides, when the electronic device connected to the master outlet 34 is turned off or enters into sleep mode, the electronic device connected to the slave outlet 36 will accordingly be turned off.

Figure 4:
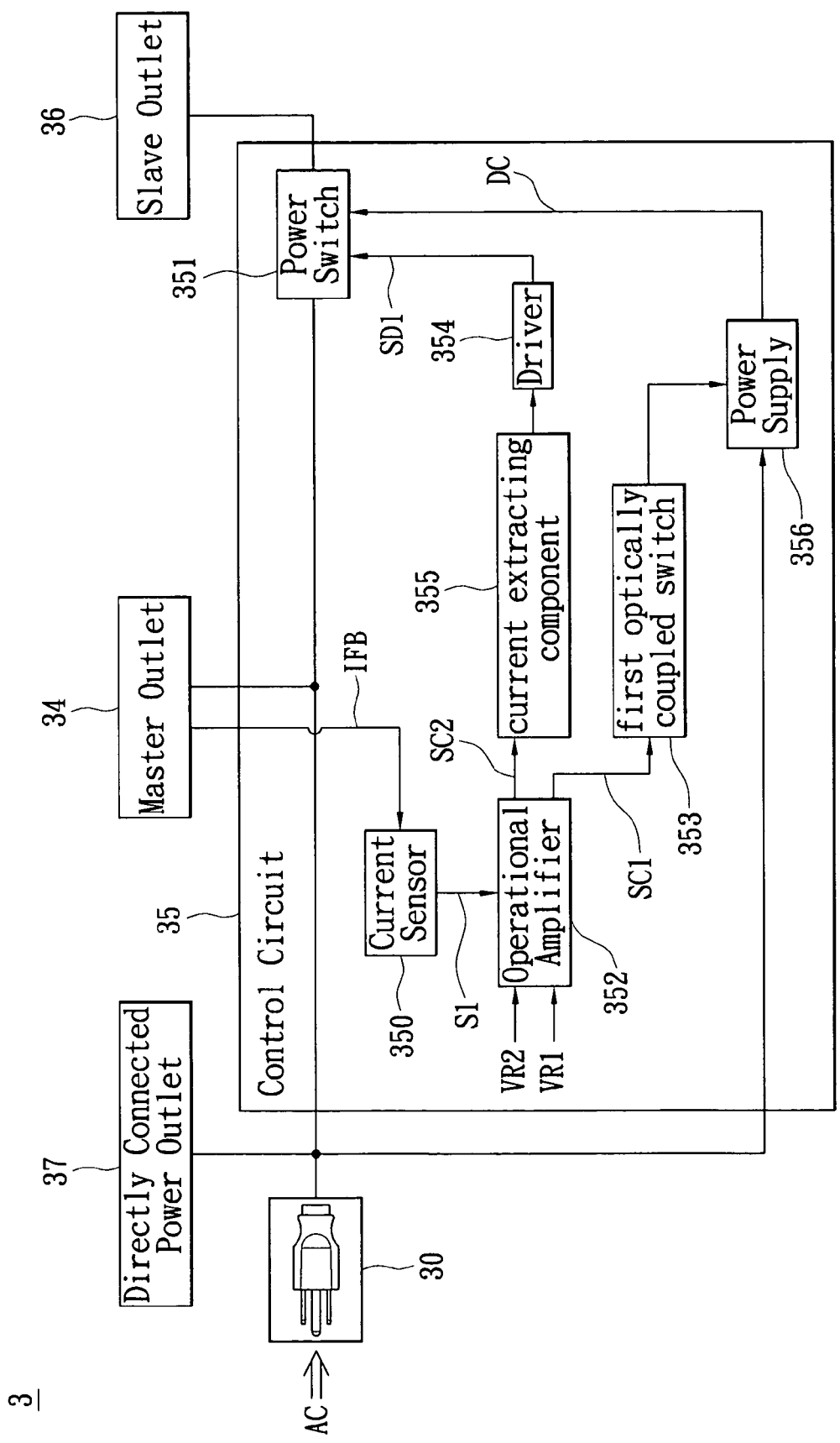
FIG. 4 shows a circuit block diagram of the first embodiment according to the present invention.

In conjunction with FIG. 3, refer to FIG. 4, in which a circuit block diagram of the first embodiment according to the present invention is shown. In said first embodiment according to the present invention, the circuit blocks of the master/slave outlet system 3 consist of an AC plug 30, master outlets 34, slave outlets 36, directly connected power outlets 37 and a control circuit 35. At the same time, the control circuit 35 comprises a current sensor 350, a power switch 351, an operational amplifier 352, a driver 354 and a power supply 356.

In the first embodiment, the AC plug 30 is used to receive AC power (AC). The master outlet 34 and directly connected power outlet 37 are all coupled to the AC plug 30. Whereas the slave outlet 36 are coupled to the AC plug 30 by means of the power switch 351. Besides, in the control circuit 35, the current sensor 350 is coupled to the master outlet 34 and, thus, can receive a feedback current IFB from the master outlet 34, and outputs a sensing signal S1. The operational amplifier 352 is coupled to the current sensor 350, and receives a first reference voltage VR1 and a second reference voltage VR2. The operational amplifier 352 amplifies and compares the sensing signal S1 with the first reference voltage VR1 so as to output a first control signal SC1, and also amplifies and compares the sensing signal S1 with the second reference voltage VR2 to output a second control signal SC2. In the aforementioned texts, the first reference voltage VR1 is smaller than the second reference voltage VR2.

The power supply 356 is coupled to the AC plug 30, operational amplifier 352 and power switch 351, which is controlled by the first control signal SC1 to convert the AC power into a supply voltage to allow use by the power switch 351. The driver 354 is coupled top the operational amplifier 352 and power switch 351 for receiving a second control signal SC2, and also outputs a driving signal SD1 to the power switch 351 for controlling the switching in the power switch 351.

Referring again to FIG. 4, the power supply 356 receives the first control signal SC1 from the operational amplifier 352 via a first optically coupled (OC) switch 353. Moreover, the driver 354 receives the second control signal SC2 from the operational amplifier 352 through a current extracting component 355. Additionally, the power switch 351 is preferred to be a relay; meanwhile, the driver 354 is preferred to be a transistor (BJT) or a Field Effect Transistor (FET), while an AC/DC converter is a preferable choice for the power supply 356.

Referring again to FIG. 4, when the electronic device connected to the master outlet starts to operate, the current sensor 350 receives from the master outlet 34 the feedback current IFB generated during the operation of the electronic device, and converts the received feedback current IFB into the sensing signal S1 for output. Next, the operational amplifier 352 first compares the sensing signal S1 with the first reference voltage VR1, and then compares the sensing signal S1 with the second reference voltage VR2. In case the voltage of the sensing signal S1 is higher than the first reference voltage VR1, the operational amplifier 352 sends a first control signal SC1 to the power supply 356; at this moment, the power supply 356 will be under the control of the first control signal SC1, thus outputting the supply voltage DC to the power switch 351, so as to provide required power for operations to the power switch 351.

Subsequently, when the sensing signal S1 raises up to an extent that the voltage thereof exceeds the second reference voltage VR2, the operational amplifier 352 sends the second control signal SC2 to the driver 354. The driver 354 is now controlled by the second control signal SC2, and outputs the driving signal SD1 to the power switch 351 for controlling the conductance of the power switch 351. At this time, AC power will be introduce via the AC plug 30, flowing through the conducting power switch 351, into the slave outlet 36, so as to provide the use of electrical power by the electronic device connected to the salve outlet 36.

Referring once again to FIG. 4, when the electronic device connected to the master outlet 34 is turned off or enters into sleep mode, the feedback current IFB from the master outlet 34 becomes almost zero, thus the sensing signal S1 sent by the current sensor 350 is accordingly also almost zero. Therefore, the voltage of the sensing signal S1 is smaller than the second reference voltage VR2, thus the operational amplifier 352 transfers the second control signal SC2 to the driver 354. The driver 354 is now under the control of the second control signal SC2, outputting the driving signal SD1 to the power switch 351, which controls the power switch 351 to be turned off. At this time, the provision of the AC power introduced from the AC plug will be stopped, preventing the electronic device connected to the slave outlet 36 from use of electrical power.

Next, when the voltage of the sensing signal S1 drops below the first reference voltage VR1, the operational amplifier controls the power supply 356 to stop outputting the supply voltage DC to the power switch 351. Hence, the master/slave outlet system 3 according to the present invention may resolve said problems of convenience, security and power-saving, and simultaneously meet the requirements specified in the standard of green energy (standby power <1 W).

Figure 5:
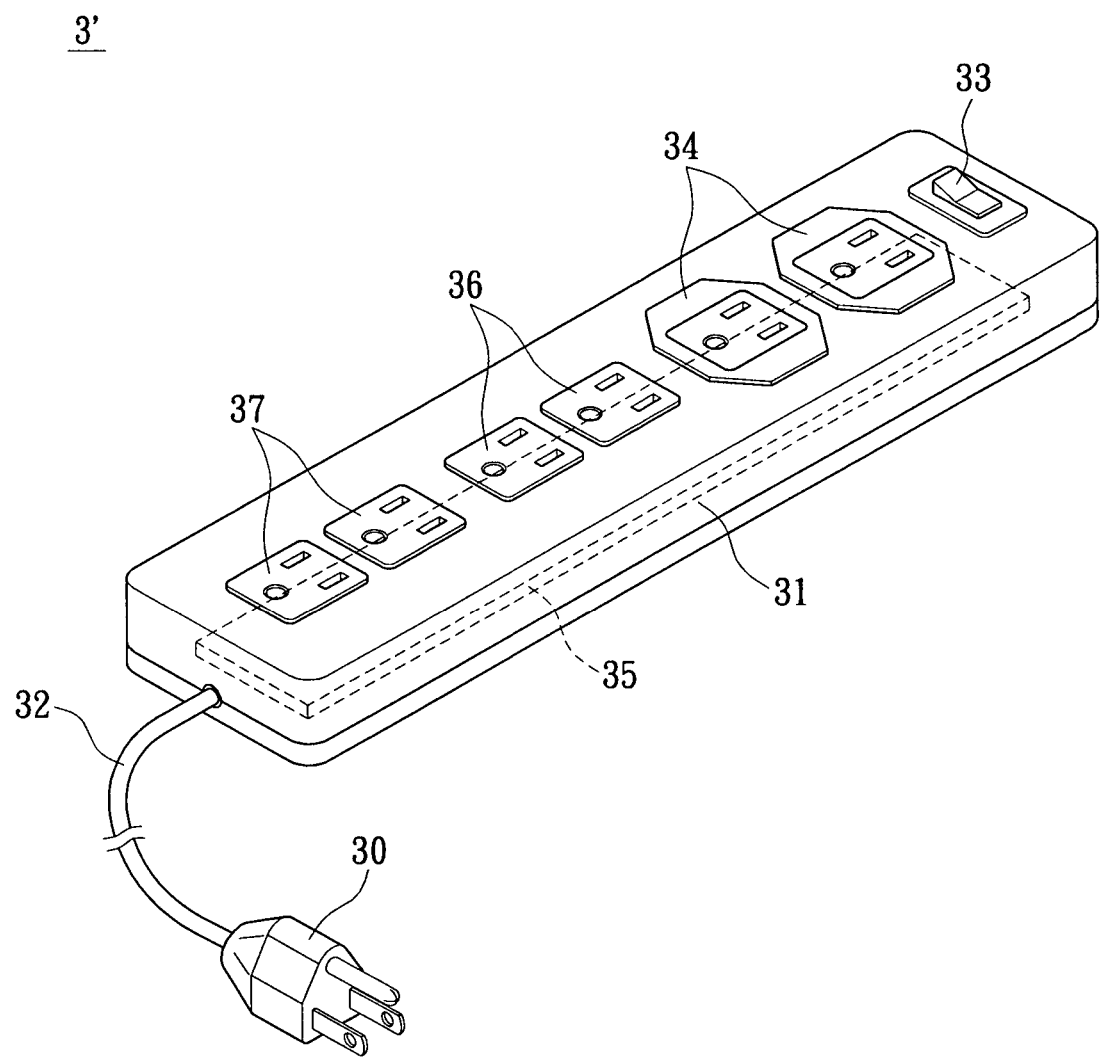
FIG. 5 shows a perspective diagram of a second embodiment according to the present invention.

In conjunction with FIG. 3, refer to FIG. 5, wherein a perspective diagram of a second embodiment according to the present invention is shown. The components depicted in the second embodiment according to the present invention are identical to the ones shown in the first embodiment according to the present invention, which are all marked with the same reference numbers or symbols. The circuit operation principles and effects achieved thereby found in both the first and the second embodiments are the same, whereas their major differences lie in: from the prospect of the master/slave outlet system 3' of the second embodiment according to the present invention, it further comprises an active switch 33, in which the active control switch 33 is installed on the body 31, coupled to the control circuit 35 inside the body 31.

Figure 6:
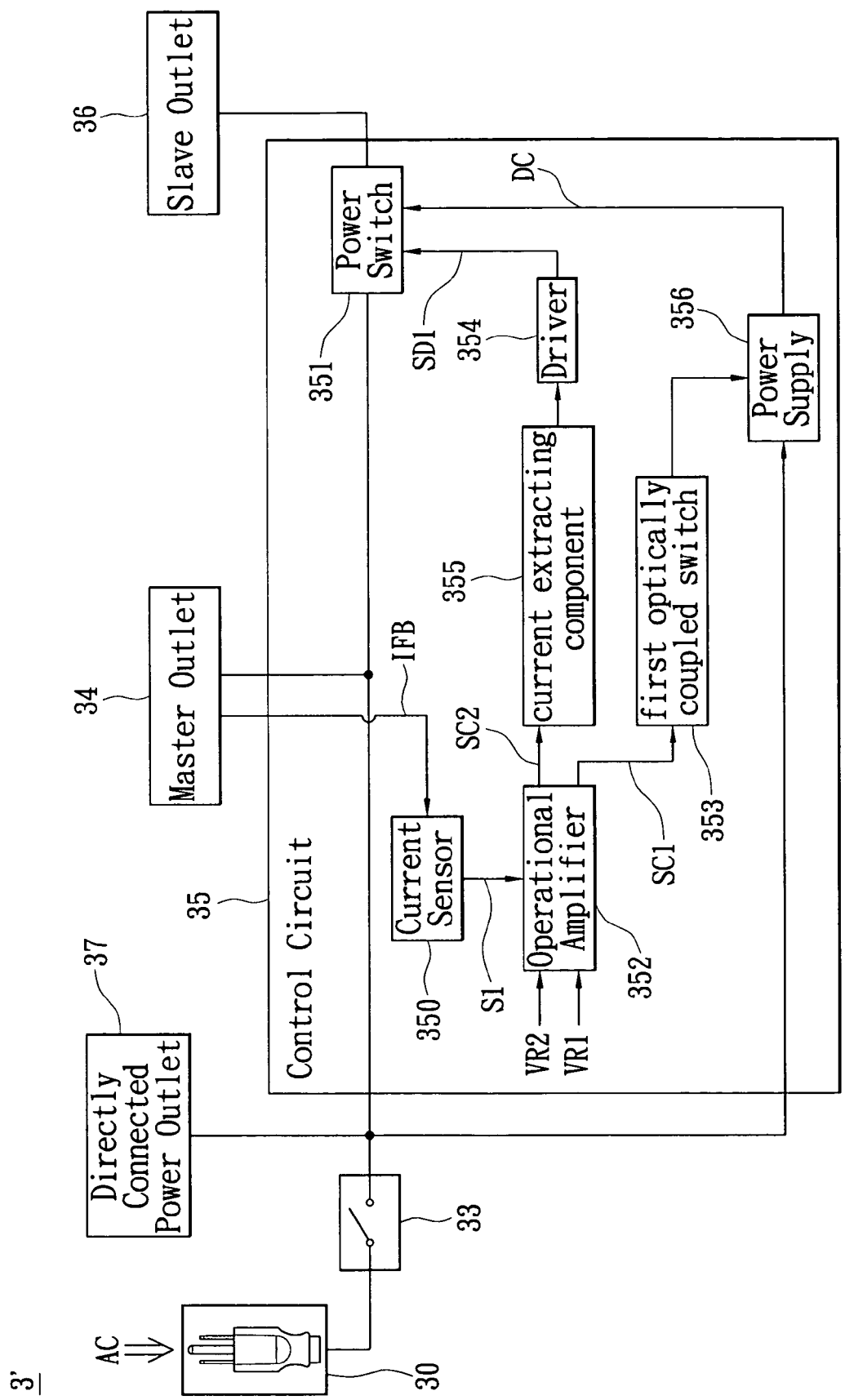
FIG. 6 shows a circuit block diagram of the second embodiment according to the present invention.

In conjunction with FIG. 4, refer to FIG. 6, wherein a circuit block diagram of the second embodiment according to the present invention is shown. The components depicted in the second embodiment according to the present invention are identical to the ones shown in the first embodiment according to the present invention, which are all marked with the same reference numbers or symbols. The major differences there between are: the master/slave outlet system 3' of the second embodiment according to the present invention further comprises an active switch 33 coupled between the AC plug 30 and the master outlet 34, directly connected power outlet 37, power switch 351 and power supply 356. The active control switch 33 is used to control the introduction of AC power from the AC plug 30, conducting or switching off the master outlet 34, directly connected power outlet 37, power switch 351 and power supply 356, so as to provide secure use of electrical power.

In summary, the master/slave outlet system according to the present invention provides master outlets and slave outlets, and when the electronic device connected to the master outlet is supplied with enough current, the slave outlet will become conducting, allowing the electronic device connected to the slave outlet to be turned on accordingly. When the electronic device connected to the master outlet is turned off or enters into sleep mode, the electronic device connected to the slave outlet will be also turned off accordingly. In this way, the master/slave outlet system according to the present invention can resolve the problems of convenience, security and power-saving, and at the same, meets the requirements set by the specification of green energy (standby power <1 W).

The aforementioned descriptions simply illustrate the preferred embodiments of the present invention, but the features and characteristics of the present invention are by no means restricted thereto. All possible modifications or alternations that any skilled persons of the relevant arts may conveniently consider are deemed to be encompassed within the scope of the present invention delineated by the claims set out hereunder.

What is claimed is:

1. A master/slave outlet system, which comprises:
   an alternative current (AC) plug for receiving AC power;
   at least one master outlet, coupled to the AC plug;
   at least one salve outlet;
   a power switch, whose first end is coupled to the AC plug, and whose second end is coupled to the slave outlet;
   a current sensor, coupled to the master outlet, for receiving a feedback current from the master outlet and for outputting a sensing signal;
   an operational amplifier, coupled to the current sensor, in which the operational amplifier is used for amplifying and comparing the sensing signal with a first reference voltage to output a first control signal, and for amplifying and comparing the sensing signal with a second reference voltage to output a second control signal;
   a power supply, coupled to the AC plug, operational amplifier and power switch, which is controlled by the first control signal, so as to convert the AC power into a supply voltage to provide to the power switch; and
   a driver, coupled to the operational amplifier and power switch, which receives the second control signal and outputs a driving signal to the power switch, so as to control the power switch.

2. The master/slave outlet system according to claim 1, wherein the power supply is coupled to the operational amplifier through a first optically coupled (OC) switch.

3. The master/slave outlet system according to claim 1, wherein the driver is coupled to the operational amplifier through a current extracting component.

4. The master/slave outlet system according to claim 1, wherein the power switch is a relay.

5. The master/slave outlet system according to claim 1, further comprising at least one directly connected power outlet, and each of the directly connected power outlets is directly connected to the AC plug.

6. The master/slave outlet system according to claim 1, wherein the driver is a transistor, a Field Effect Transistor or a driving IC.

7. The master/slave outlet system according to claim 1, wherein the power supply is an AC/DC converter.

8. A master/slave outlet system, which comprises:
   an alternative current (AC) plug for receiving AC power;
   a master control switch, whose first end is coupled to the AC plug;
   at least one master outlet, coupled to the second end of the master control switch;
   at least one salve outlet;
   a power switch, whose first end is coupled to the second end of the master control switch, and whose second end is coupled to the slave outlet;
   a current sensor, coupled to the master outlet, for receiving a feedback current from the master outlet and for outputting a sensing signal;
   an operational amplifier, coupled to the current sensor, in which the operational amplifier is used for amplifying and comparing the sensing signal with a first reference voltage to output a first control signal, and for amplifying and comparing the sensing signal with a second reference voltage to output a second control signal;
   a power supply, coupled to the second end of the master control switch, operational amplifier and power switch, which is controlled by the first control signal, so as to convert the AC power into a supply voltage to provide to the power switch; and
   a driver, coupled to the operational amplifier and power switch, which receives the second control signal and outputs a driving signal to the power switch, so as to control the power switch.

9. The master/slave outlet system according to claim 8, wherein the power supply is coupled to the operational amplifier through a first optically coupled (OC) switch.

10. The master/slave outlet system according to claim 8, wherein the driver is coupled to the operational amplifier through a current extracting component.

11. The master/slave outlet system according to claim 8, wherein the power switch is a relay.

12. The master/slave outlet system according to claim 8, further comprising at least one directly connected power outlet, and each of the directly connected power outlet is directly connected to the second end of the master control switch.

13. The master/slave outlet system according to claim 8, wherein the driver is a transistor, a Field Effect Transistor or a driving IC.

14. The master/slave outlet system according to claim 8, wherein the power supply is an AC/DC converter.

* * * * *